June 6, 1939.  A. A. LOWEKE  2,161,304
FLUID PRESSURE BRAKING SYSTEM
Filed Sept. 27, 1937  2 Sheets-Sheet 1
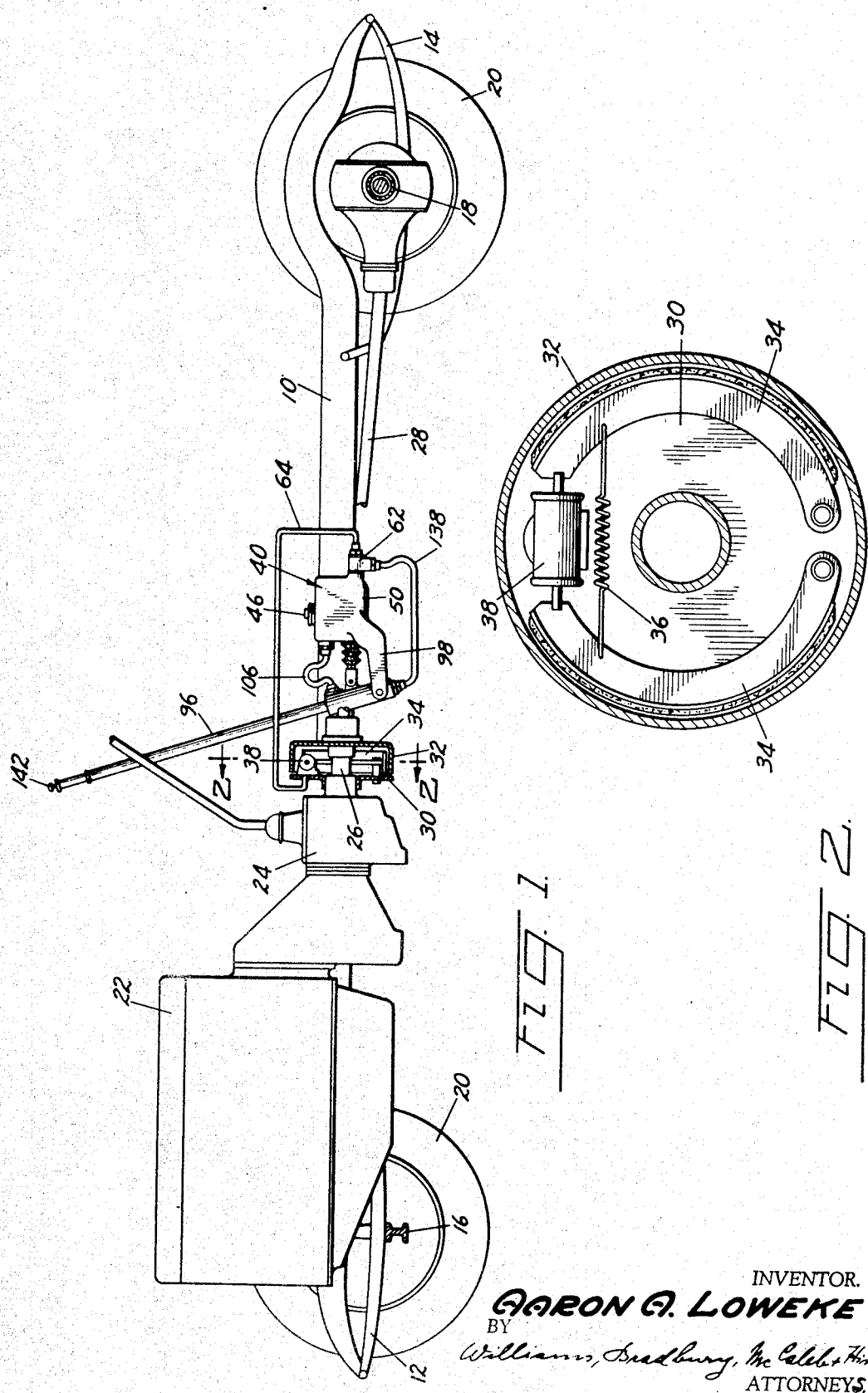
INVENTOR.
AARON A. LOWEKE
BY
Williams, Bradbury, McCaleb & Hinkle
ATTORNEYS.

Patented June 6, 1939

2,161,304

UNITED STATES PATENT OFFICE 2,161,304

FLUID PRESSURE BRAKING SYSTEM

Aaron A. Loweke, Detroit, Mich., assignor to Hydraulic Brake Company, Detroit, Mich., a corporation of California Application September 27, 1937, Serial No. 165,806

6 Claims. (Cl. 188—265)

This invention relates to fluid pressure braking systems.

Broadly the invention comprehends a fluid pressure braking system operative to effectively actuate a brake, or a plurality of brakes, and to retain the brake or brakes in applied position without further attention on the part of the operator.

In the illustrated embodiment of the invention, a fluid pressure producing device has connected thereto a fluid pressure actuated motor arranged for the actuation of the friction element of a brake associated with the main drive shaft of a motor vehicle.

An object of the invention is to provide a fluid pressure braking system operative to effectively apply a brake and to retain the brake in applied position.

Another object of the invention is to provide a fluid pressure braking system operative to effectively apply and retain a brake in applied position and to quickly release the brake at the will of the operator.

Another object of the invention is to provide a fluid pressure braking system operative to step up the pressure on the fluid in the system, to retain the pressure constant as long as desired, and to quickly release the pressure at the will of the operator.

A feature of the invention is a fluid pressure producing device including a reservoir, a cylinder supplied therefrom having a controlled discharge port, a piston reciprocable in the cylinder, and an actuator for the piston having a chamber therein connected to the reservoir and to the cylinder beyond the discharge port, and means in the actuator for controlling the flow of fluid through the chamber.

Other objects and features of the invention will appear from the following description taken in connection with the drawings forming a part of this specification, and in which—

Fig. 1 is a schematic view of a motor vehicle chassis illustrating the invention as applied;

Fig. 2 is a vertical sectional view of the brake; and

Figure 3:
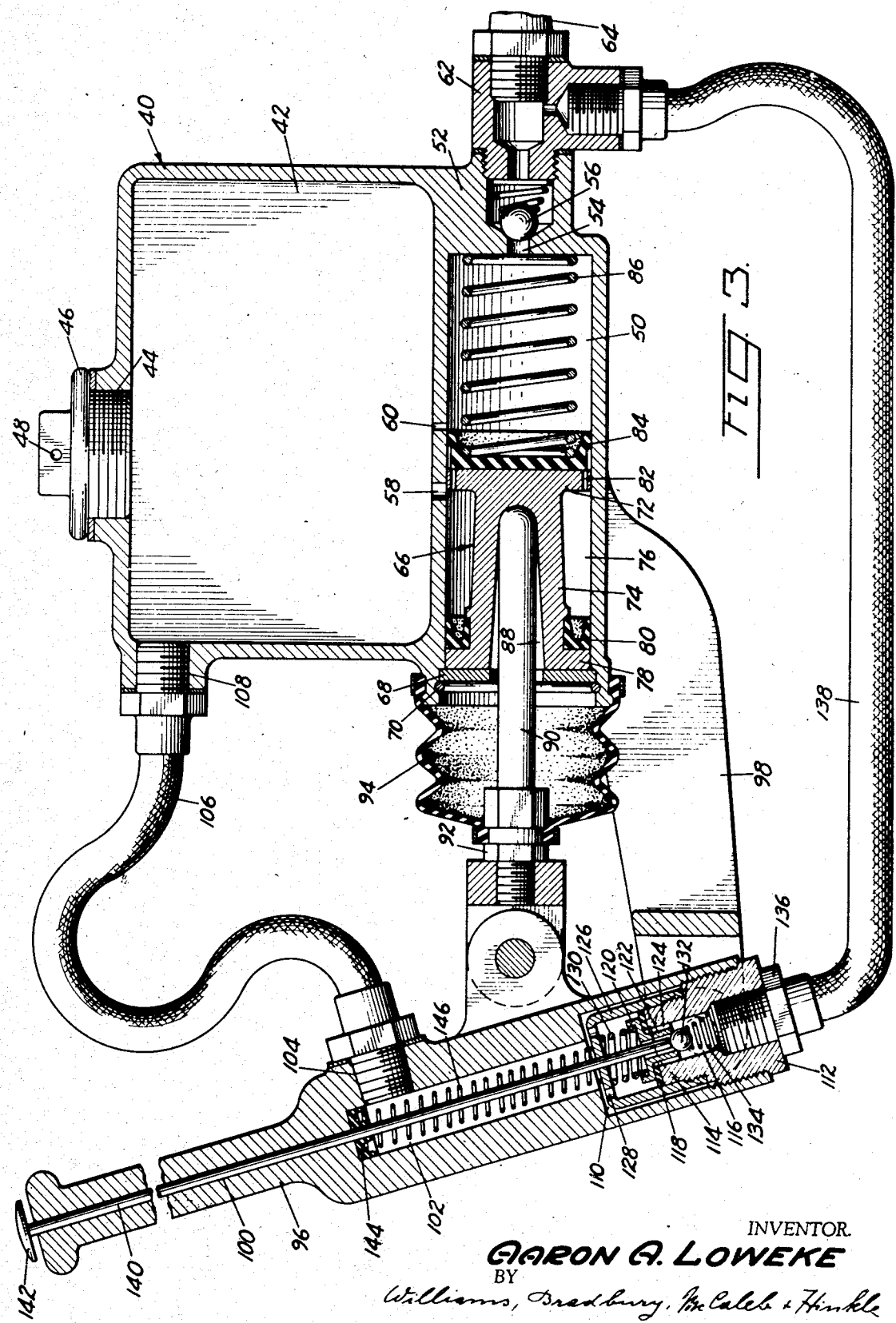
Fig. 3 is a vertical sectional view of the fluid pressure producing device.

Referring to the drawings for more specific details of the invention, 10 represents the frame of a motor vehicle chassis. The frame is supported on front springs 12 and rear springs 14 suspended respectively from a front axle 16 and a rear axle 18, and wheels 20 of conventional type are mounted for rotation on the respective axles.

A power plant or internal combustion engine 22 supported on the frame has associated therewith a transmission 24 having its main shaft 26 connected by a driven shaft 28 to the differential of the rear axle 18, and associated with the main shaft is a brake of conventional type.

Preferably the brake includes a fixed support or backing plate 30, suitably secured to the housing of the transmission 24, a drum 32 associated with the backing plate mounted on and for rotation with the main shaft 26, a pair of corresponding friction elements or shoes 34 pivoted on the backing plate, a retractile spring 36 connecting the shoes, and a fluid pressure actuated motor 38 mounted on the backing plate between the shoes and operative to actuate the shoes into engagement with the drum against the resistance of the retractile spring.

A fluid pressure producing device 40 suitably supported on the frame includes a reservoir 42 having a filling opening 44 normally closed as by a plug 46 having openings 48 for venting the reservoir to the atmosphere. Formed at the base of the reservoir is a cylinder 50 open at one end and closed at its other end as by a head 52 having a discharge port 54 controlled by a check valve 56 for inhibiting retrograde movement of the fluid. The cylinder also has arranged in its wall spaced ports 58 and 60 providing communications between the cylinder and the reservoir.

The discharge port of the cylinder has connected thereto beyond the check valve 56 a two-way fitting 62, and one branch of this fitting is connected by a fluid pressure delivery pipe 64 to the fluid pressure actuated motor 38 of the brake, the purpose of the other branch of the two-way fitting 62 will hereinafter appear.

A piston 66 reciprocable in the cylinder is held against displacement by a washer 68 seated on an annular shoulder in the open end of the cylinder and secured in place as by a retaining ring 70 seated in a groove in the wall of the cylinder. The piston has a head 72, a reduced body portion 74 providing in conjunction with the wall of the cylinder an annular chamber 76 communicating with the reservoir by way of the port 58, and a skirt 78 having thereon a sealing cup 80 for inhibiting seepage of fluid from the cylinder.

The head 72 of the piston has a plurality of spaced passages 82 therethrough providing communications between the annular chamber 76 and that portion of the cylinder forward of the piston. A collapsible sealing cup 84 seated on the head 72 controls the passages, and a spring 86 interposed between the cup and the head 52 of the cylinder serves to retain the cup against displacement and also to return the piston to its retracted position.

The piston has a recess 88 in its back for the reception of one end of a thrust pin 90, and the other end of the thrust pin has thereon a fitting 92 connected as by a flexible boot 94 to the open end of the cylinder for the exclusion of dust from the cylinder. The fitting 92 is connected as by a clevis to an operating lever 96 pivotally mounted on a bracket 98 formed integral with the cylinder 50.

The operating lever 96 has an axial bore 100, a portion of which has an increased diameter providing a passage 102 having a port 104 connected as by a flexible tube 106 to an opening 108 in the wall of the reservoir adjacent to the top thereof, and another portion of this axial bore 100 is increased in diameter to provide a chamber 110 communicating directly with the passage 102 and opening at the bottom of the lever.

A plug 112 secured in the open end of the chamber 110 has a concentric extension 114, and the plug and its extension are bored to provide an axial passage 116 controlled as by a two-way valve. As shown, a rubber washer 118 seated on the extension supports an annular disk 120 having a concentric sleeve 122 depending therefrom into the passage 116, and the sleeve is slotted on its periphery as at 124 for the passage of fluid when the disk is raised from its seat.

A cage 126 secured to the extension has openings 128 therethrough for the passage of fluid, and a spring 130 interposed between the cage and the disk 120 yieldingly retains the disk on its seat. The sleeve 122 is normally closed by a ball 132 urged to its seat by a spring 134 seated on a fitting 136 threaded in the outer end of the plug and connected as by a flexible tube 138 to the branch fitting 62.

A rod 140, extending through the bore 100, the passage 102, and the chamber 110, has one end supported on the ball 132 and its other end projecting from the top of the operating lever and provided with a button 142, and a sealing cup 144 seated on the annular shoulder at the junction of the bore 100 and the passage 102 is held against displacement by a spring 146 interposed between the cup and the shell 126.

In a normal operation, upon actuation of the operating lever 96, force is transmitted therefrom through the thrust pin 90 to the piston 66, resulting in movement of the piston on its compression stroke. During the initial movement of the piston on its compression stroke the sealing cup 84 on the head of the piston covers the port 60, and thereafter, as the piston moves on its compression stroke, fluid in the cylinder 50 forward of the piston is displaced therefrom through the discharge port 54, past the valve 56 and through the fluid pressure actuated motor 38, causing energization of the motor, resulting in actuation of the friction elements or shoes 34 into engagement with the drum 32 against the resistance of the retractile spring 36.

Because of the valve 56, inhibiting retrograde movement of the fluid, the brake is retained in applied position without further attention on the part of the operator or by the employment of mechanical means serving to retain the actuating lever in depressed position, and, because of this condition, should it be found desirable to apply the brake with increased force, the operator may repeatedly actuate the operating lever so as to build up pressure in the fluid pressure delivery pipe 64 and the motor 38. The pressure built up in the delivery pipe and motor is limited to the extent of the load on the spring 130, urging the two-way valve to its seat, so that excessive pressure tending to rupture the delivery pipe 64 may be avoided. When excessive pressure is imposed on the fluid in the system, the two-way valve opens, whereupon a small quantity of fluid is returned to the reservoir.

When it is desired to effect an immediate release of the brake, either at the time of applying the brake or subsequently thereto, the operator presses on the thumb button 142 and this force is transmitted through the rod 140 to the ball valve 132, resulting in opening the valve, whereupon the fluid in the motor 38 and the fluid pressure delivery line 64 is returned under the pressure of the retractile spring 36 connecting the friction elements by way of the flexible tube 138, past the valve 132, through the sleeve 122, the valve chamber 110, the passage 102, and the flexible tube 106 to the reservoir, and upon release of the operating lever the spring 86 becomes effective to return the piston 66 to its retracted position.

As the piston returns to its retracted position, fluid is drawn from the reservoir 42, through the port 58, into the annular chamber 76, thence through the passages 82 in the head of the piston, past the cup 84, into that portion of the cylinder forward of the piston, completely filling the cylinder.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure braking system comprising a reservoir, a cylinder supplied therefrom having a discharge port, a check valve controlling the discharge port, a piston reciprocable in the cylinder, an actuator for the piston, a fluid pressure actuated motor connected to the cylinder beyond the check valve, a brake actuated by the motor, and a relief valve in the actuator connected to the reservoir and to the cylinder beyond the check valve.

2. A fluid pressure braking system comprising a reservoir, a cylinder supplied therefrom having a discharge port, a check valve controlling the discharge port inhibiting retrograde movement of fluid, a piston reciprocable in the cylinder, an actuator for the piston, a fluid pressure actuated motor connected to the cylinder beyond the check valve, a brake actuated by the motor, a relief valve in the actuator, a fluid delivery means connecting the relief valve to the reservoir, other fluid delivery means connecting the relief valve intermediate the check valve and the motor, and means carried by the actuator for opening the relief valve.

3. A fluid pressure producing device comprising a reservoir, a cylinder supplied therefrom having a discharge port, a check valve controlling the discharge port, a piston reciprocable in the cylinder, an actuator for the piston, a valve chamber in the actuator connected to the reservoir and to the discharge port of the cylinder beyond the check valve, a relief valve in the chamber, and means slidable in the actuator for opening the relief valve.

4. A fluid pressure system comprising a fluid pressure producing device, an actuator therefor, a fluid pressure actuated motor connected to the device, means for maintaining fluid pressure in said motor, means, including said actuator, forming a by-pass conduit around said first named means, and means for manually controlling fluid flow through said by-pass.

5. A fluid pressure system comprising a fluid pressure producing device, a hollow lever for actuating said device, a fluid pressure actuated motor connected to the device, means for maintaining fluid pressure in said motor, and means comprising said hollow lever and a flexible conduit forming a by-pass around said first named means, a valve in said hollow lever controlling said by-pass, and a rod in said hollow lever for operating said valve.

6. A fluid pressure system comprising a reservoir, a cylinder supplied therefrom, a piston reciprocable in the cylinder, an actuator for the piston, a fluid pressure actuated motor connected to the cylinder, a check valve intermediate the cylinder and motor, means, including said actuator, constituting a by-pass for connecting the reservoir with the motor side of check valve, a relief valve in said actuator, and means for manually operating said relief valve.

AARON A. LOWEKE.